United States Patent Office 2,838,060
Patented June 10, 1958

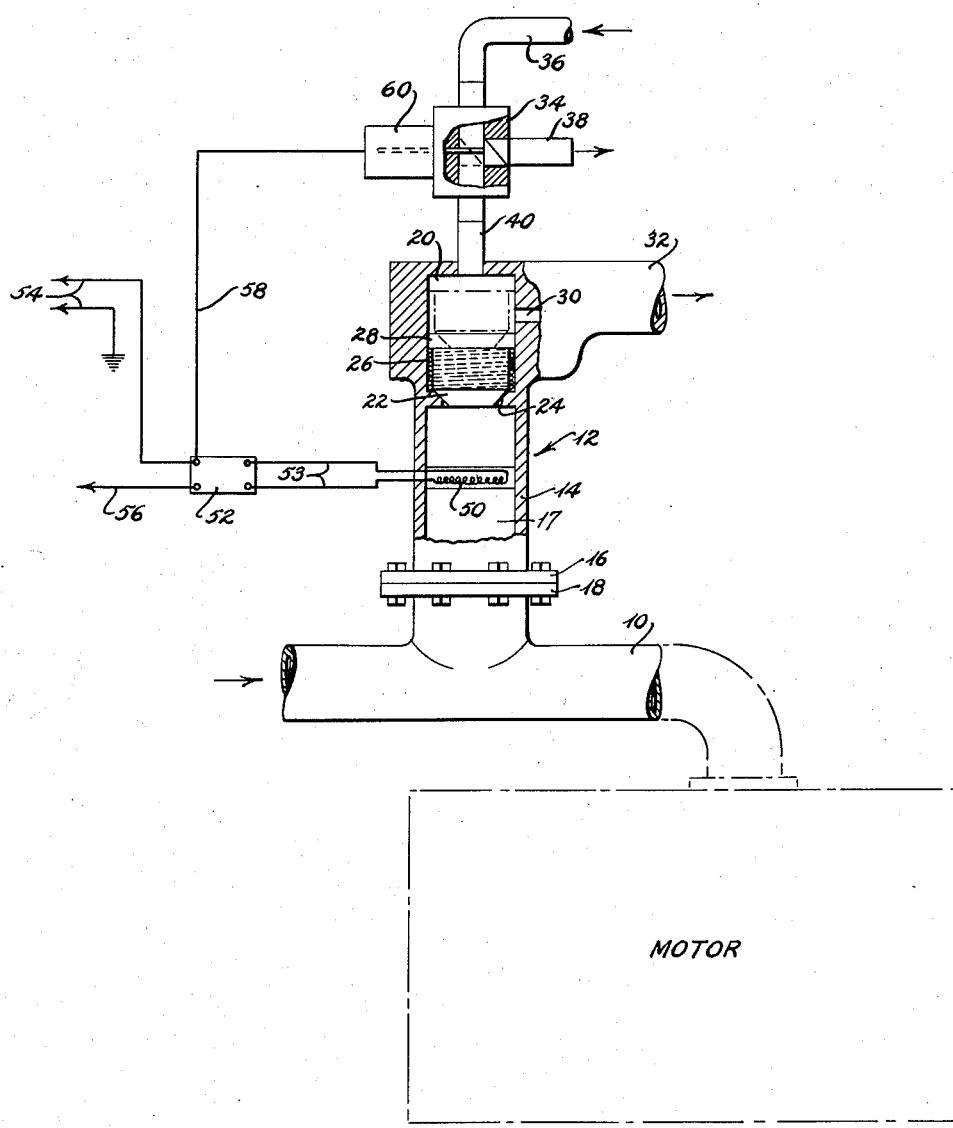

2,838,060

AUTOMATIC OXYGEN VAPOR VENT VALVE FOR ENGINES

Mirabeau C. Towns, Jr., Rockaway, N. J., assignor, by mesne assignments, to the United States of America as represented by the Secretary of the Navy Application July 14, 1953, Serial No. 367,946

3 Claims. (Cl. 137—115)

This invention relates to improvements in attachments for engines of the type that employ oxygen for oxidizing the liquid propellant.

In order that rocket engines using liquid oxygen as an oxidizer may start easily and smoothly, it is necessary that entrained air or vapor be removed from the oxidizer conduit before the propellent valves for the engine are opened. To accomplish this, and as an object of this invention, an automatic vent valve is provided which is pressure operated and controlled by a temperature sensitive electrical unit disposed in communication with the oxidizer line, the temperature sensitive unit being responsive to the heat contained in liquid and gaseous fluid in the oxidizer line.

A more specific object of the invention is to provide a temperature sensitive unit arranged to cause the actuation of a switch, which switch may be connected in series with an engine ignition system, but which has as its primary function the control of a fluid pressure supply line, the fluid pressure conducted by which exerts a force on the valve element of the vent valve, holding it in the closed position against the biasing opposition of a spring, whereby when gaseous media is present in the vicinity of the sensing unit, the fluid pressure normally holding the valve in the closed position is relieved allowing the yielding force of the spring to open the main vent valve, consequently permitting the undesired vapors to escape from the liquid oxygen line, manifold or the like, to which the device is attached.

Other objects and features of importance will become apparent in following the description of the illustrated form of the invention.

In the drawing, the figure is an elevational view of one form of the invention, portions being shown in section, other portions being shown schematically, and there being a schematic representation of a typical motor that would have use for an oxygen line.

The typical motor, so labeled in the drawing, has the oxygen line, as manifold 10, connected therewith in the usual manner. Attached to this line 10 is a vent valve 12, consisting of a valve body 14 having a mounting flange 16 at the lower open end of the lower valve chamber 17 connected to a mounting flange 18 on the line 10. The two flanges 16 and 18, together with their bolts constitute means for attaching the vent valve to the liquid oxygen line 10. The upper end of the valve body 14 has the upper valve chamber 20 in which there is a poppet valve element 22 capable of reciprocatory motion from its valve seat 24 to an opposite end of a valve chamber 20. Valve element 22 is yieldingly biased, that is, there is a spring 26 seated upon and reacting on a shoulder of the valve seat 24 and a circular flange 28 on the poppet valve element 22. Accordingly, in the absence of exterior forces the poppet valve element 22 is retained in the open position by the yielding means or spring 26. When the valve is in the closed position as shown in full line in the drawing, no vapor or other fluid may pass beyond seat 24. However, when the valve element 22 is in the open position as shown in phantom line, fluid may pass through valve body 14, chamber 20 and through discharge opening 30 that is in communication with valve chamber 20, discharge opening 30 being preferably provided with port extension 32 in the form of a conduit for venting to the atmosphere.

Means are provided for holding valve element 22 in the closed position, against opposition of yielding means 26. These means preferably consist of an electrically operated two way valve 34 having an inlet conduit 36 for gas under pressure, for example, ram air pressure or pump pressure. In the dotted line position of valve 34 gas entering valve 34 is vented through discharge tube 38, while in the solid line position of valve 34, the gas under pressure enters valve chamber 20 through a pipe 40 that establishes communication between chamber 20 and the valve 34. The source of gas under pressure (unshown) must be sufficiently great to maintain the valve element 22 in the closed position, that is, on seat 24, notwithstanding the constant exhausting of the gas through discharge opening 30. By having discharge opening 30 of lesser cross-sectional area than pipe 40, a sufficient head of pressure may be maintained in valve chamber 20 to accomplish this purpose.

A temperature responsive unit 50, to detect the presence of gaseous oxygen in valve body 14, by the difference in temperature between gaseous oxygen and liquid oxygen, is disposed in the lower valve chamber 17 and is connected with a resistance switch 52 by electrical conductors 53. The resistance switch 52 may be connected in series with the electrical circuit of the engine, schematically indicated at 54 in order to control that circuit, however, this is not essential. Electrical power supply line 56 is connected to another terminal of switch 52, and there is an electrical conductor 58 extending from switch 52 to the solenoid 60 of the electrically operative valve 34.

Accordingly, the operation is as follows:

Whenever gaseous oxygen, as its vapors, accumulates in manifold 10, and this will happen particularly during the starting cycle of an engine, for example, a rocket engine, these vapors enter valve body 14. Since the temperature level of oxygen vapors is considerably higher than the temperature level of liquid oxygen, temperature sensitive unit 50 detects this and electrically transmits this information to resistance switch 52. Switch 52 being normally closed as to ignition circuit 54, and normally closed as to solenoid 60, will open, thereby releasing solenoid 60 and allowing its internal spring to move valve 34 into such position as to exhaust the actuating gas through discharge tube 38. In as much as the gas pressure in chamber 20 is relieved by this valve setting, spring 26 lifts valve element 22 from its seat 24 thereby establishing communication (through valve chamber 20) between the interior of valve body 14 and discharge opening 30. Thus, any vapor in valve body 14 will be exhausted, and when liquid oxygen enters valve body 14, the sensing unit 50 will detect this and cause the valve element 22 to close upon seat 24.

It is apparent that various modifications may be made without departing from the invention as claimed.

What is claimed is:

1. In an engine having an oxidizer conducting line, a venting device for the line comprising a valve body provided with a movable valve element, means reacting on said element for moving it to an open position, means disposed in said valve body between one side of said valve element and said conducting line for detecting the presence of gases in said valve body, fluid pressure means connected to said body on the other side of said valve element for normally holding said valve element in a closed position in opposition to said valve element moving means, said fluid pressure means having a valve therein for controlling the flow of the fluid therethrough, a discharge opening connected to the same side of said body as said fluid pressure means ,and means operatively connecting said gas detecting means with said fluid pressure valve means to control the actuation of the latter in response to the presence of gases in said valve body.

2. A venting device for gases accumulated in a liquid flow line comprising a lower chamber for said gases communicating with said flow line, an upper chamber connected to said lower chamber by a passage, a discharge opening connected to said upper chamber, a main valve having a gas pressure area and in operative relationship with said passage for controlling flow of gases therethrough, means for biasing said valve to an open position, and means operable on the presence of gas in said lower chamber for permitting said biasing means to open said valve, said latter mentioned means comprising a duct connected to said upper chamber and valve pressure area, a gas outlet connected to said duct, an inlet to said duct for supplying control gas thereto under pressure, a two-way valve in said duct connecting said control gas either to said duct outlet or said main valve pressure area, and electrical means including a resistance element in said lower chamber for actuating said two-way valve to discharge control gas to said main valve pressure area to close said main valve when liquid contacts said resistance element and to discharge control gas through said gas outlet to open said main valve when gases contact said resistance element.

3. A venting device for use with an engine oxidizer line comprising a valve body adapted to connect with said line, said body having upper and lower chambers connected by a passage, a main valve associated with said passage for controlling the flow of fluid therethrough, means biasing said valve to open position, said upper chamber being provided with a pressure inlet opening and a vent, a conduit having a fluid under pressure therein, a two-way solenoid operated valve connected to said conduit, said valve having a discharge tube connected to one outlet thereof and a pipe connected to another outlet thereof, said pipe being connected at its other end to the pressure inlet opening of said upper chamber, an electrical unit sensitive only to the differential in temperature between liquid and gaseous oxidizer located in said lower chamber between said main valve and line, and means operatively connecting said unit with said solenoid whereby when gaseous oxidizer is detected by said unit in said lower chamber said solenoid is actuated to move the valve to discontinue the fluid pressure being exerted on said main valve thereby permitting said biasing means to move said main valve to the open position, allowing the gaseous oxidizer to pass out through the vent.

References Cited in the file of this patent
UNITED STATES PATENTS

| | | |
|---|---|---|
| 476,376 | Fleming | June 7, 1892 |
| 926,389 | Collins | June 29, 1909 |
| 2,139,126 | Jennings | Dec. 6, 1938 |
| 2,213,446 | McGrath | Sept. 3, 1940 |
| 2,434,799 | Higgens | Jan. 20, 1948 |
| 2,580,016 | Gilbert | Dec. 25, 1951 |
| 2,602,461 | Walter | July 8, 1952 |